(12) United States Patent
Iijima

(10) Patent No.: US 7,382,977 B2
(45) Date of Patent: Jun. 3, 2008

(54) IMAGE CAPTURE APPARATUS

(75) Inventor: Ryunosuke Iijima, Ebina (JP)

(73) Assignee: Canon Kabushiki Kaisha (JP)

( * ) Notice: Subject to any disclaimer, the term of this patent is extended or adjusted under 35 U.S.C. 154(b) by 408 days.

(21) Appl. No.: 11/300,014

(22) Filed: Dec. 14, 2005

(65) Prior Publication Data

US 2006/0140619 A1 Jun. 29, 2006

(30) Foreign Application Priority Data

Dec. 28, 2004 (JP) ............................ 2004-381606

(51) Int. Cl.
G03B 17/18 (2006.01)
(52) U.S. Cl. .................. 396/287; 348/333.02
(58) Field of Classification Search ................ 396/287, 396/290, 291, 296, 374; 348/333.01, 333.02, 348/333.04
See application file for complete search history.

(56) References Cited

U.S. PATENT DOCUMENTS 5,148,202 A * 9/1992 Yoshida ....................... 396/296

FOREIGN PATENT DOCUMENTS

JP 2000-184240 A 6/2000

OTHER PUBLICATIONS

Office Action issued in the corresponding Chinese application No.: 2005101354019, mailed on Jul. 13, 2007.

* cited by examiner

Primary Examiner—W. B. Perkey
(74) Attorney, Agent, or Firm—Rossi, Kimms & McDowell, LLP

(57) ABSTRACT

An image capture apparatus has a continuous photographing mode for continuously photographing still images. The image capture apparatus includes an image capture unit, a pseudo shutter curtain generating unit, an image synthesizing unit, and a display unit. The image capture unit generates an image signal of an object. The pseudo shutter curtain generating unit generates a pseudo shutter curtain signal corresponding to a pseudo shutter curtain. The image synthesizing unit synthesizes the image signal generated by the image capture unit and the pseudo shutter curtain signal generated by the pseudo shutter curtain generating unit. The display unit displays the image signal and the pseudo shutter curtain signal. The pseudo shutter curtain generating unit sets the pseudo shutter curtain to be translucent, if the image capture apparatus is in the continuous photographing mode.

8 Claims, 5 Drawing Sheets

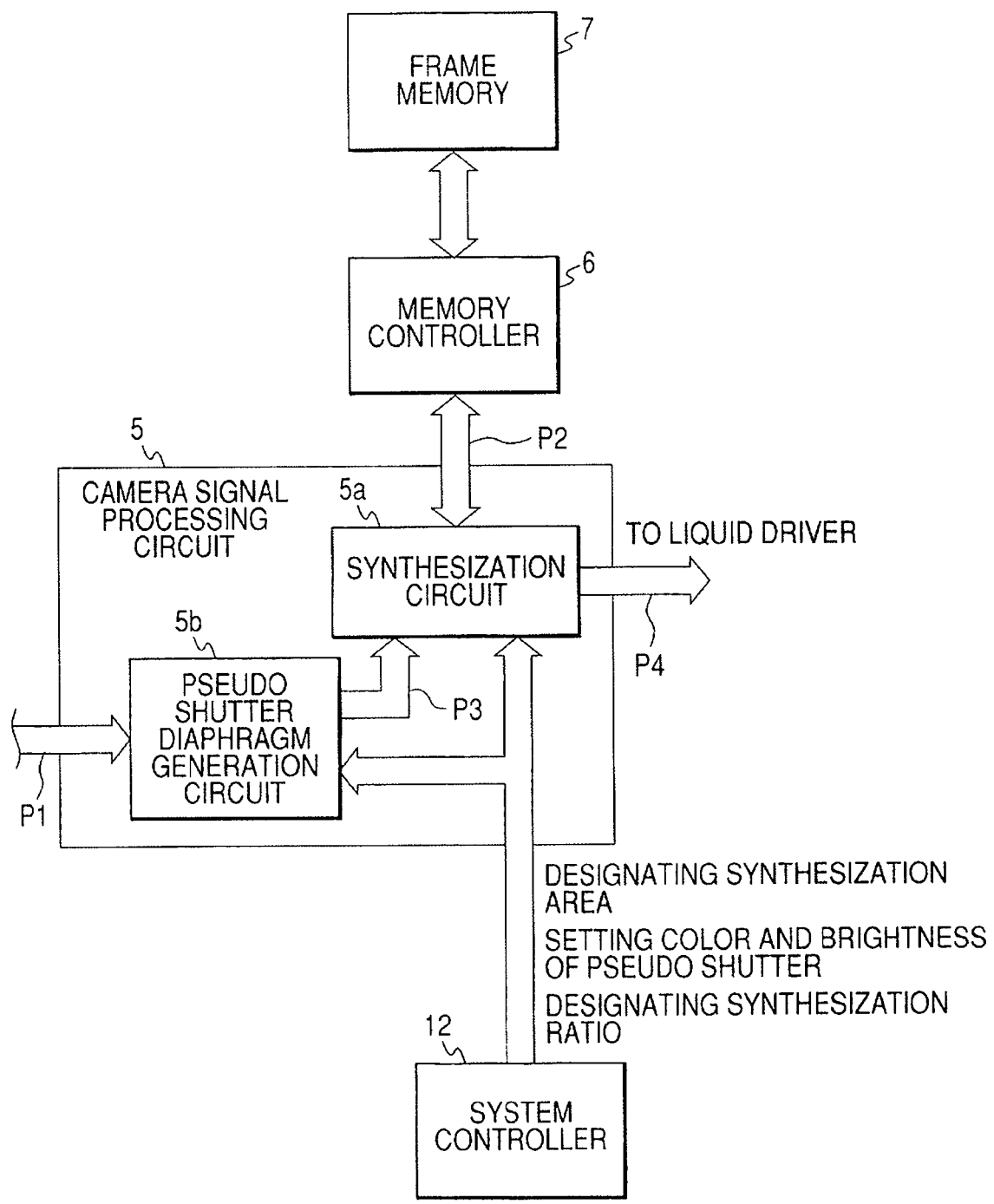

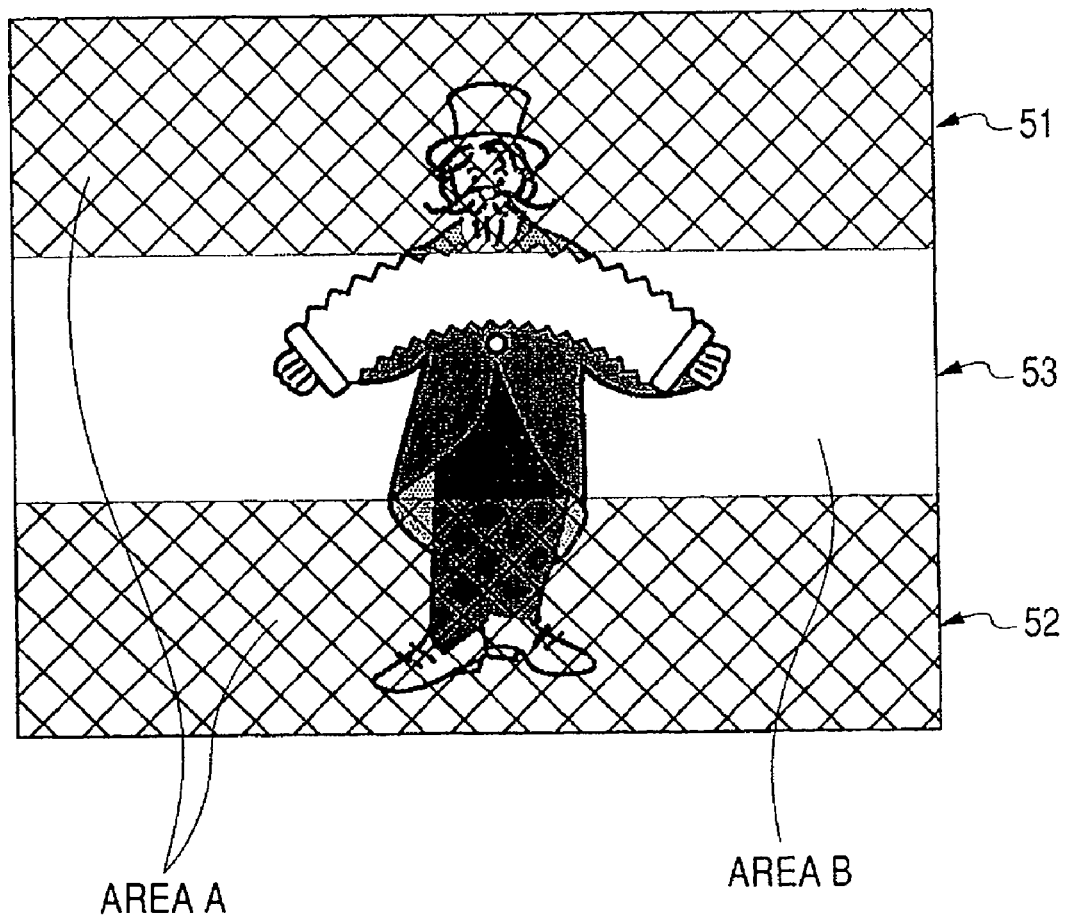

IMAGE CAPTURE APPARATUS

BACKGROUND OF THE INVENTION

1. Field of the Invention

The present invention relates to an image capture apparatus such as a digital camera.

2. Related Background Art

In recent years, the number of digital camera systems have been increasing in which when a photographer depresses a release button for photographing a still image, a pseudo shutter curtain is displayed, and a mechanical shutter sound is output to the photographer as in a silver film camera, so that the photographer can realize the photographing of the still image (see, e.g., Japanese Patent Application Laid-Open No. 2000-184240).

Moreover, in recent years, the number of digital camera systems have been increasing which is provided with not only a function of photographing the still image but also varieties of functions such as a continuous photographing function capable of continuously photographing the still image and an auto exposure bracket (AEB) function of automatically deflecting exposure in a "+" or "−" direction to perform the photographing.

Furthermore, there are: a system in which a pseudo shutter curtain effect during single photographing is utilized as such during continuous photographing; and a system in which a pseudo shutter curtain is synthesized in only first photographing during the continuous photographing, and the pseudo shutter curtain is not displayed in second and subsequent photographing.

As to effects produced by the above-described pseudo shutter curtain, the curtain is very effective because the photographer can recognize the moment at which the still image has been photographed during single photographing. However, when the still image is continuously photographed, the pseudo shutter curtain opens and closes every time the photographing is performed. Therefore, an object displayed in a liquid crystal monitor is obstructed. Moreover, in a case where the photographer chases and photographs a moving object during the continuous photographing, there is a problem that the pseudo shutter curtain hinders the object from being easily recognized.

Especially in these years, the continuous photographing has been speeded up, and the number of still images which can be photographed in one second has been increasing. Therefore, when the number of the still images that can be photographed in one second increases, the object displayed in the liquid crystal monitor is covered with the pseudo shutter curtain more. Therefore, in a case where the continuous photographing is performed at a high seed, a time for which an operator cannot recognize the object increases. In consequence, visibility of the object is remarkably impaired in the high-speed continuous still-image photographing.

To avoid the above-described disadvantage, there is a system in which the pseudo shutter curtain is displayed in the liquid crystal monitor in the only first photographing during the continuous photographing. In this system, the photographer cannot easily recognize a time when the continuous photographing has been completed, and this might generate a disadvantage that "the last important scene could not be photographed during the continuous photographing".

SUMMARY OF THE INVENTION

The present invention is to overcome the above-described drawbacks.

Another object of the present invention is to inform a photographer that continuous photographing is being performed, and display an object in a display device as easily viewably as possible.

According to an aspect of the present invention, there is provided an image capture apparatus comprising: an image capture unit adapted to generate an image signal of an object; a display unit adapted to display the image signal; a pseudo shutter curtain generation unit adapted to generate a pseudo shutter curtain signal for displaying a pseudo shutter curtain; an image synthesization unit adapted to synthesize the image signal generated by the image capture unit and the pseudo shutter curtain signal generated by the pseudo shutter curtain generation unit; and a control unit adapted to control operations of the image capture unit, the pseudo shutter curtain generation unit, and the image synthesization unit, wherein the control unit controls the operations of the pseudo shutter curtain generation unit and the image synthesization unit in accordance with an image capture state of the image capture unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the present invention and, together with the description, serve to explain the principles of the present invention.

FIG. 4 is a block diagram showing a pseudo shutter curtain generation circuit and a synthesization circuit; and FIG. 5 is a diagram showing a display example of a pseudo shutter curtain in a liquid crystal monitor.

DESCRIPTION OF THE PREFERRED EMBODIMENTS

Preferred embodiments of the present invention will be described in detail below with reference to the drawings.

First Embodiment

An embodiment of the present invention will be described hereinafter with reference to the drawings.

Figure 1:
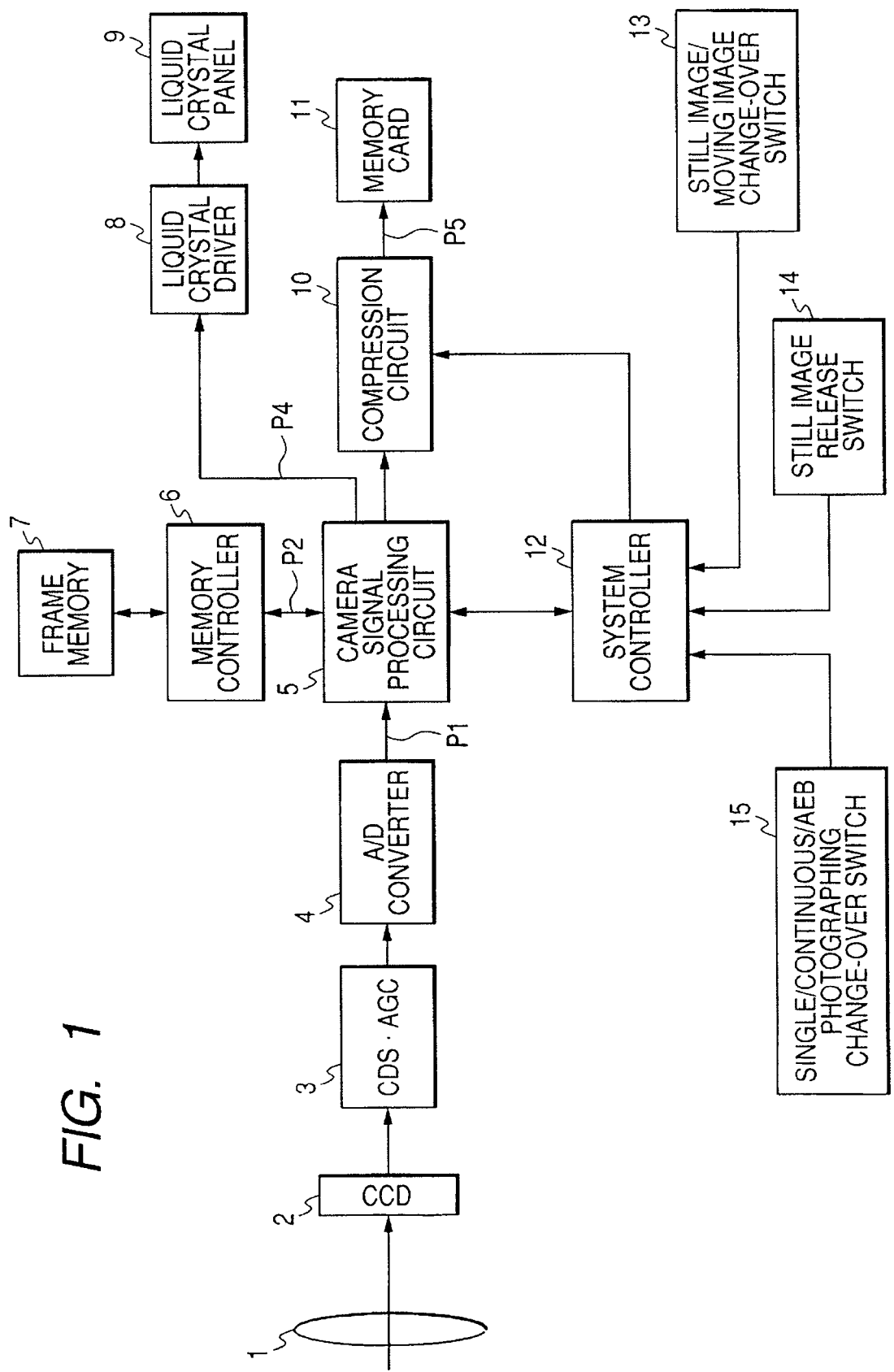
FIG. 1 is a block diagram showing a main part constitution example of a digital camera in an embodiment of the present invention.

FIG. 1 is a block diagram showing a constitution example of a digital camera (image capture apparatus) of the present embodiment. In FIG. 1, reference numeral 1 denotes a focus lens for focusing the camera. Light passed through the focus lens 1 is formed into an image on an image capture plane of a CCD 2, and photoelectrically converted into an electric signal.

The signal photoelectrically converted on the image capture plane of the CCD 2 is read in accordance with a reference clock, sampled and held by CDS/AGC 3, controlled into an optimum gain under control of a system controller 12, and then converted into a digital signal synchronized with the reference clock by an A/D converter 4.

An image signal P1 converted into the digital signal by the A/D converter 4 is sent to a camera signal processing circuit 5. The image signal P1 sent to the camera signal processing circuit 5 is subjected to various signal processing to generate image data P2.

The image data P2 generated by the camera signal processing circuit 5 is temporarily retained in a frame memory 7 by a memory controller 6. As separately described later, the camera signal processing circuit 5 contains a synthesization circuit 5a and a pseudo shutter curtain generation circuit 5b (see FIG. 4), and the image data P2 read from the frame memory 7 and a pseudo shutter curtain signal P3 generated by the pseudo shutter curtain generation circuit 5b are synthesized by the synthesization circuit 5a.

A liquid crystal driver 8 converts photographing image data P4 output from the camera signal processing circuit 5 into a signal for displaying the data in a liquid crystal panel 9, and the data is displayed as a captured image in the liquid crystal panel 9. A compression circuit 10 compresses still or moving image data output from the camera signal processing circuit 5 at a compression ratio indicated by the system controller 12 to produce compressed image data P5, and records the data in a memory card 11.

A still image/moving image changeover switch 13 is arranged as means for determining whether to photograph the object as a still image or a moving image. A still image release switch 14 is input means for notifying the system controller 12 of a timing to take in the still image, when the still image is photographed. The system controller 12 is control means for controlling the whole operation of a digital camera. A single/continuous/AEB photographing changeover switch 15 is a switch for switching the photographing of the still image to the single photographing or the continuous photographing, and for deflecting a parameter of brightness from correct exposure to over (+) or under (−) exposure to switch the photographing to an auto exposure bracket (AEB) for continuous photographing.

Figure 2:
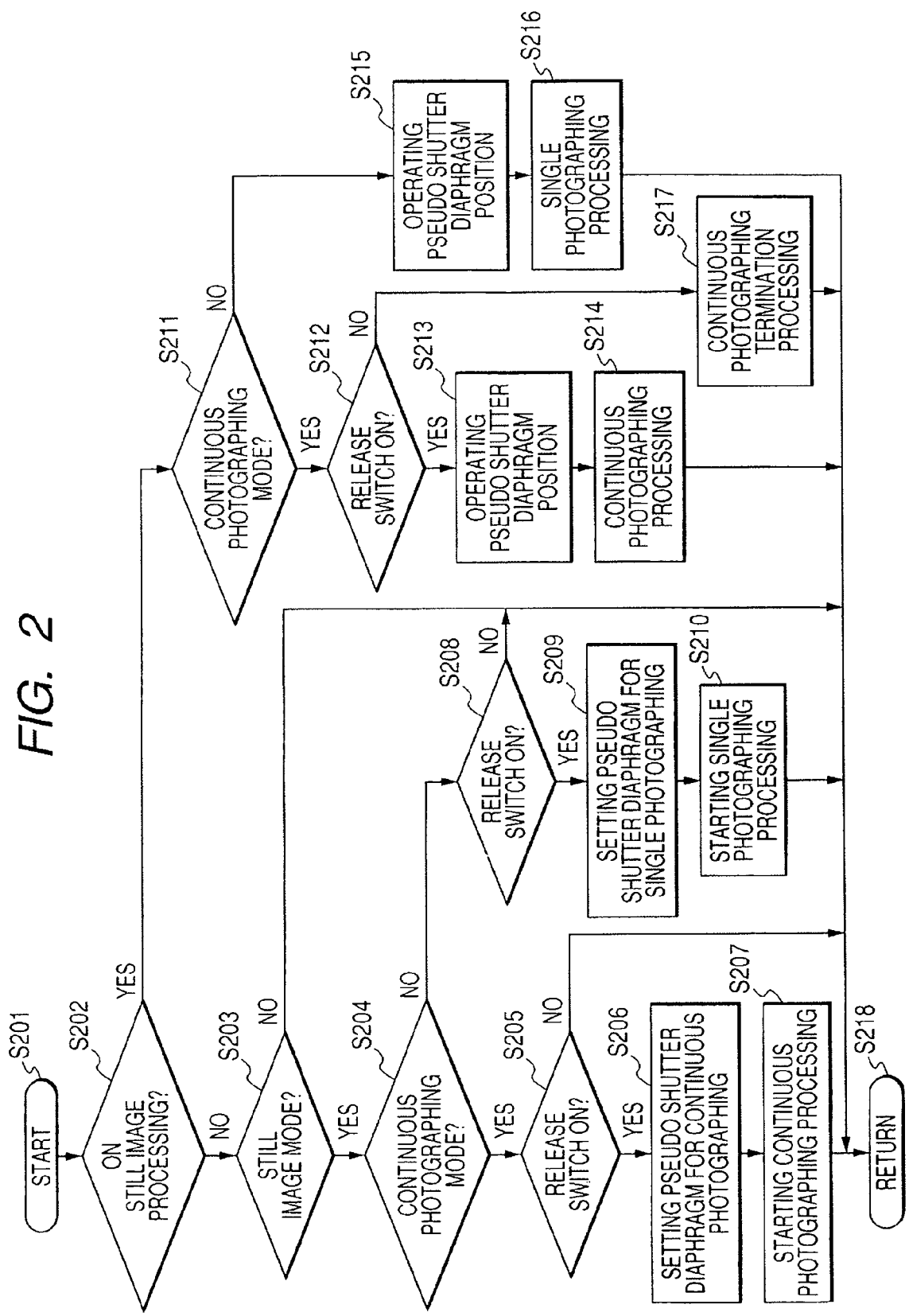
FIG. 2 is a flowchart showing continuous and single photographing operations of a system controller in the embodiment.

Next, there will be described an operation procedure of the digital camera of the present embodiment with reference to a flowchart of FIG. 2. It is to be noted that in the present embodiment, a "continuous photographing mode" is a photographing mode to continuously photograph still images of a plurality of frames while the release switch continues to be depressed. A "single photographing mode" is a photographing mode to photograph the still image of one frame every time the release switch is depressed. An "AEB continuous photographing" is a photographing mode to continuously photograph the still image of a plurality of frames (e.g., still images of three frames) while automatically changing exposure conditions.

In the present embodiment, when a power supply is turned on, the system controller 12 starts its operation in step S201. In the present embodiment, while power is supplied to the digital camera, processing of steps S201 to S218 is repeatedly performed in a certain cycle.

When the operation is started in the step S201, the processing advances to step S202 to judge whether or not the camera is on still image processing. As a result of this judgment, when the camera is not on the still image processing, the processing advances to step S203 to judge whether or not a mode is a still image mode. As a result of the judgment, when the mode is not the still image mode, the processing advances to step S218, thereby terminating this processing.

On the other hand, as a result of the judgment of the step S203, when it is judged that the mode is the still image mode, the processing advances to step S204 to judge whether the camera is in the continuous still-image photographing mode or the single photographing. This judgment is performed based on an input from the single/continuous/AEB photographing changeover switch 15.

When the single photographing mode is judged in the step S204, the processing advances to step S208 to judge whether or not the release switch 14 is depressed. As a result of the judgment of the step S208, unless the release switch 14 is depressed, the processing advances to the step S218, thereby terminating this processing.

On the other hand, as a result of the judgment of the step S208, when the release switch 14 is depressed, the processing advances to step S209 to set color and brightness of the pseudo shutter curtain for the single photographing. Then, the processing advances to step S210 to start the single still-image photographing. Subsequently, the processing advances to the step S218, thereby terminating this processing.

On the other hand, as a result of the judgment of the step S204, when the continuous still-image photographing mode is judged, the processing advances to step S205 to judge whether or not the release switch 14 is depressed. As a result of the judgment of the step S205, unless the release switch 14 is depressed, the processing advances to the step S218, thereby terminating this processing.

Moreover, as a result of the judgment of the step S205, when the release switch 14 is depressed, the processing advances to step S206 to set the pseudo shutter curtain for the continuous photographing. Moreover, the processing advances to step S207 to start the continuous still-image photographing. The processing advances to the step S218, thereby terminating this processing.

On the other hand, as a result of the judgment of the step S202, when it is judged that the camera is on the still-image photographing, the processing advances to step S211 to judge whether the mode is the continuous still-image photographing or the single photographing. This judgment is performed based on the input from the single/continuous/AEB photographing changeover switch 15.

As a result of the judgment of the step S211, when the single photographing mode is judged, the processing advances to step S215. After the pseudo shutter curtains gradually cover a screen from screen upper and lower parts thereof to cover the whole screen, a position is calculated to perform reverse processing, and area information is transmitted to the synthesization circuit 5a in the camera signal processing circuit 5 described later. Then, the processing advances to step S216 to perform the single photographing. Thereafter, the processing advances to the step S218, thereby terminating this processing.

Moreover, as a result of the judgment of the step S211, when it is judged that the camera is in the continuous still-image photographing mode, the processing advances to step S212 to judge whether or not the release switch 14 is depressed. As a result of the judgment, unless the release switch 14 is depressed, the photographer judges that the continuous still-image photographing is completed. The processing advances to step S217 to perform processing to complete the continuous still-image photographing. Thereafter, the processing advances to the step S218, thereby terminating this processing.

On the other hand, as a result of the judgment of the step S212, when the release switch 14 is depressed, it is judged that the continuous still-image photographing continues. The processing advances to step S213. After the pseudo shutter curtains gradually cover the screen from the screen upper and lower parts thereof to cover the whole screen, the position is calculated to perform the reverse processing, and the area information is transmitted to the synthesization circuit 5a in the camera signal processing circuit 5 described later. Next, the processing advances to step S214 to perform the continuous still-image photographing. Thereafter, the processing advances to the step S218, thereby terminating this processing.

As described above, according to the digital camera of the present embodiment, the pseudo shutter curtain is set to be translucent for the continuous still-image photographing, and visibility of the object during the continuous still-image photographing is remarkably enhanced. A control is executed so that it can be visually recognized, without depending on character display, that the continuous still-image photographing is being performed.

Accordingly, the pseudo shutter curtain can be displayed on the displayed image in accordance with a continuous photographing speed, and the visibility of the object during the high-speed continuous still-image photographing can be remarkably enhanced.

Moreover, when the pseudo shutter curtain is set to 100% of black during the single photographing, a usual shutter curtain effect can be exerted. When the color or the brightness of the pseudo shutter curtain is varied in accordance with an internal state of the digital camera, that is, a changeover state to the continuous/single photographing in this manner, there can be produced the pseudo shutter curtain effect that the photographer can easily recognize the object.

Second Embodiment

Figure 3:
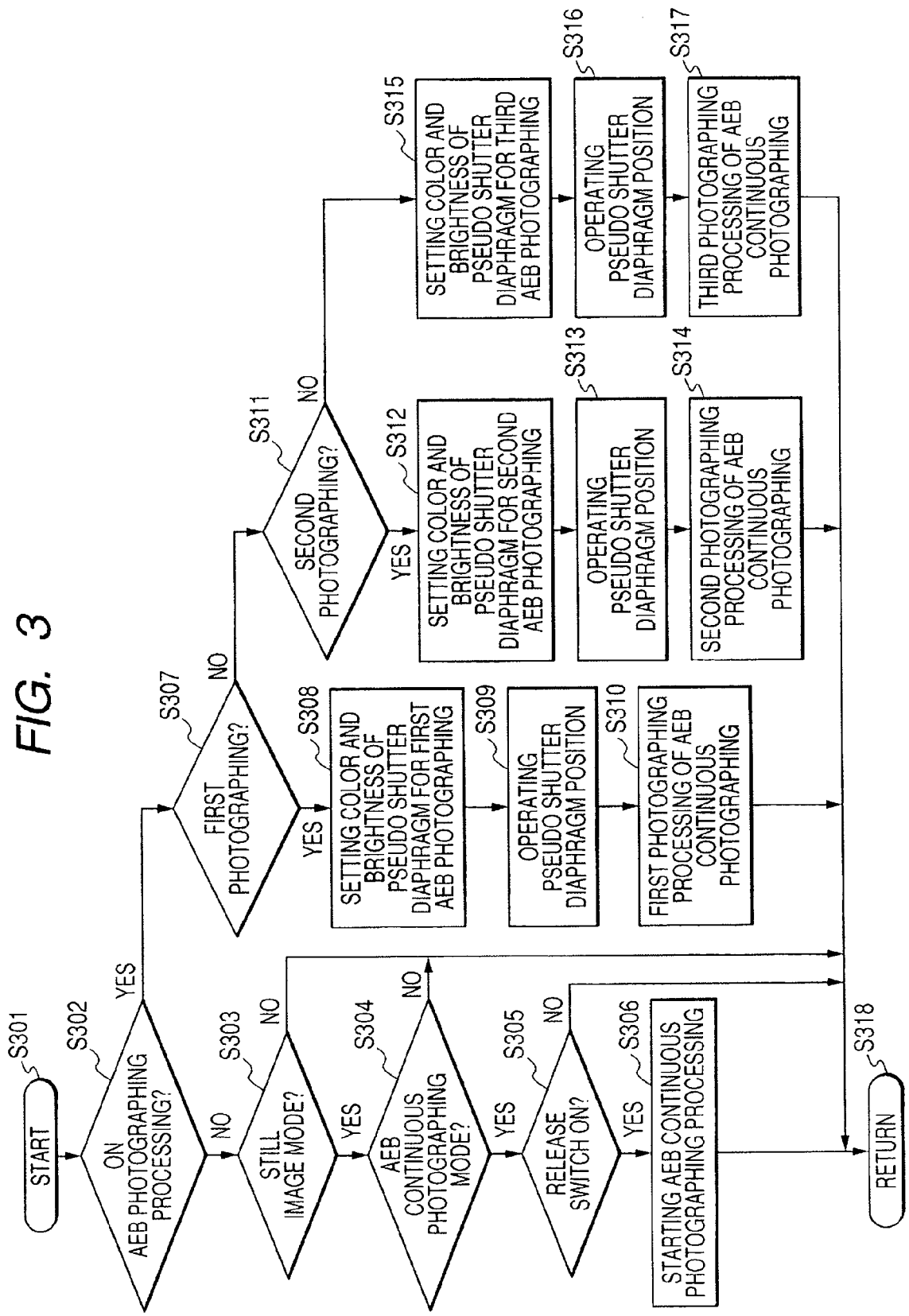
FIG. 3 is a flowchart showing an AEB continuous photographing operation.

Next, there will be described processing by a system controller 12 during the AEB continuous photographing with reference to a flowchart showing an AEB continuous photographing operation in FIG. 3.

When a power supply is turned on, the system controller 12 starts its operation in step S301. While power is supplied to a digital camera, processing of steps S301 to S318 is repeatedly performed in a certain cycle.

When the operation is started in the step S301, the processing advances to step S302 to judge whether or not the camera is on AEB continuous still-image processing. As a result of this judgment, when the camera is not on the AEB continuous still-image processing, the processing advances to step S303 to judge whether or not a mode is a still-image mode. As a result of the judgment, when the mode is not the still image mode, the processing advances to step S318, thereby terminating this processing.

Moreover, as a result of the judgment of the step S303, when it is judged that the mode is the still image mode, the processing advances to step S304 to judge whether or not the camera is in the AEB continuous photographing mode, based on an input from a single/continuous/AEB photographing changeover switch 15. As a result of the judgment of the step S304, when the AEB continuous photographing mode is judged, the processing advances to step S305 to judge whether or not a release switch 14 is depressed. As a result of the judgment of the step S305, unless the release switch 14 is depressed, the processing advances to the step S318, thereby terminating this processing.

Furthermore, when the release switch 14 is depressed in the step S305, the processing advances to step S306 to start the AEB continuous photographing. Thereafter, the processing advances to the step S318, thereby terminating this processing. When it is judged in the step S304 that the mode is not the AEB continuous photographing mode, the processing advances to the step S318, thereby terminating this processing.

On the other hand, there will be described a case where it is judged that the camera is photographing the still image as a result of the judgment of the step S302. As a result of the judgment of the step S302, when it is judged that the camera is on the AEB photographing processing, the processing advances to step S307 to judge whether or not first AEB still-image photographing is performed. As a result of this judgment, when it is judged that the first photographing is performed, the processing advances to step S308 to set color and brightness of a pseudo shutter curtain for the first AEB photographing.

Then, the processing advances to step S309. After the pseudo shutter curtains gradually cover a screen from upper and lower parts thereof to cover the whole screen, a position is calculated to perform reverse processing, and area information is transmitted to a synthesization circuit 5a in a camera signal processing circuit 5 described later. Next, the processing advances to step S310 to perform the first photographing of the AEB continuous photographing. Thereafter, the processing advances to the step S318, thereby ending this processing.

Moreover, as a result of the judgment of step S307, when it is judged that the first photographing is not performed, the processing advances to step S311 to judge whether or not second photographing is performed in the AEB continuous photographing. As a result of the judgment, when it is judged that the second photographing is performed, the processing advances to step S312 to set the color and brightness of the pseudo shutter curtain for the second AEB photographing. Then, the processing advances to step S313. After the pseudo shutter curtains gradually cover the screen from the upper and lower parts thereof to cover the whole screen, the position is calculated to perform reverse processing, and the area information is transmitted to the synthesization circuit 5a in the camera signal processing circuit 5 described later. Next, the processing advances to step S314 to perform the second still-image photographing in the AEB continuous photographing. Thereafter, the processing advances to the step S318, thereby terminating this processing.

Furthermore, when it is judged in the step S311 that the second photographing is not performed, the processing advances to step S315 to set the color and brightness of the pseudo shutter curtain for the third AEB photographing. Next, the processing advances to step S316. After the pseudo shutter curtains gradually cover the screen from the upper and lower parts thereof to cover the whole screen, the position is calculated to perform the reverse processing, and the area information is transmitted to the synthesization circuit 5a in the camera signal processing circuit 5 described later. Next, the processing advances to step S317 to perform the third still-image photographing in the AEB continuous photographing. Thereafter, the processing advances to the step S318, thereby terminating this processing.

It is to be noted that in the present embodiment, there has been described the continuous photographing of three images by over, standard, and under exposures during the AEB continuous photographing. However, correction may be performed finer, and the number of images during the AEB continuous photographing may be three or more.

As described above, even during the AEB continuous photographing, the color and brightness of the pseudo shutter curtain are set in accordance with AEB brightness correction in the first, second, and third AEB photographing operations. That is, a black, gray, or white pseudo shutter curtain can be set so that it can be easily visually seen by the photographer.

Next, details of the camera signal processing circuit 5 are shown in FIG. 4. As shown in FIG. 4, in the present embodiment, the camera signal processing circuit 5 contains the pseudo shutter curtain generation circuit 5b and the synthesization circuit 5a. The image data P2 whose signal has been processed by the camera signal processing circuit 5 is once stored in the frame memory 7, and returned again to the camera signal processing circuit 5 via the memory controller 6.

The image data P2, and the pseudo shutter curtain signal P3 output from the pseudo shutter curtain generation circuit 5b are synthesized in the synthesization circuit 5a, and output to the liquid crystal driver 8. In this case, the system controller 12 designates areas to be synthesized, and supplies information of a synthesization ratio to the synthesization circuit 5a. Moreover, the controller supplies information of the color and brightness to the pseudo shutter curtain generation circuit 5b, so that the brightness, the color, the synthesization ratio, and the areas to be synthesized can be varied.

Accordingly, when the color, brightness, and synthesization ratio of the pseudo shutter curtain are varied in accordance with the internal state of the digital camera, a movement of the object can be visually recognized by the photographer. For example, when the synthesization ratio of the pseudo shutter curtain and the photographed image is set to 50:50 during the continuous photographing, it is possible to solve a problem that the object is not easily recognized during the continuous still-image photographing. Especially the following problem can be solved: in recent years, the continuous photographing has been speeded up; therefore a time for which the object is covered with the pseudo shutter curtain and cannot be recognized increases, when the number of still images that can be photographed in one second increases; and consequently the visibility of the object is remarkably impaired in the high-speed continuous still-image photographing.

Moreover, even during the high-speed continuous photographing, the pseudo shutter curtain is generated for each photographing. Therefore, the photographer can easily grasp the time when the continuous photographing is completed, and it is possible to prevent the disadvantage that the last important scene could not photographed in the high-speed continuous still-image photographing.

Furthermore, since the color of the pseudo shutter curtain is changed to white, gray, black or the like in accordance with the brightness correction during the AEB continuous photographing, the photographer can visually recognize that the AEB continuous photographing is being performed.

FIG. 5 shows one example of display of the pseudo shutter curtain displayed in the liquid crystal panel 9.

In areas A covered with pseudo shutter curtains 51, 52 in this screen, an image 53 to be photographed and the pseudo shutter curtains 51, 52 are synthesized at the synthesization ratio designated by the system controller 12, and output. The synthesization is performed to output 100% of the image 53 to be photographed in an area B which is not covered with the pseudo shutter curtains 51, 52. The synthesization circuit 5a operates to synthesize the pseudo shutter curtains 51, 52 and the image 53 to be photographed at the above-described ratio.

In the present embodiment, there have been specifically described the controls of the pseudo shutter curtain in the single photographing and the continuous photographing, and the AEB continuous photographing. During the continuous photographing, in a case where the number of photographed images comes close to the number of images that can be photographed, the control may be executed so that the photographer visually recognizes that the number of remaining images that can be photographed decreases. In the control, the color, brightness, and synthesization ratio of the pseudo shutter curtains 51, 52 displayed in the liquid crystal panel 9 are changed, and such changes of the displayed states of the pseudo shutter curtains 51, 52 are utilized without using character display.

As described above, when the number of the remaining images that can be photographed decreases during the continuous photographing, the color or the brightness of the pseudo shutter curtain is changed to allow the photographer to visually recognize that the continuous photographing comes to an end.

As described above, according to the image capture apparatuses of the first and second embodiments, the pseudo shutter curtain is generated every photographing even during the high-speed continuous photographing. Therefore, the photographer can easily grasp the time when the continuous photographing is completed, and it is possible to prevent the disadvantage that the last important scene could not be photographed during the high-speed continuous photographing.

Moreover, since the color of the pseudo shutter curtain is changed to white, gray, black or the like in accordance with the brightness correction during the AEB continuous photographing, the photographer can visually recognize that the AEB continuous photographing is being performed.

It is to be noted that in the above-described embodiment, the digital camera has been described. However, the image capture apparatus of the present invention is not limited to the digital camera, and includes a digital video camera, a cellular phone provided with a camera, and the like.

Another Embodiment of the Present Invention

Each means constituting the above-described image capture apparatus of each embodiment of the present invention, and each step of the method of controlling the image capture apparatus can be realized by operating a program stored in a RAM, a ROM or the like of a computer. This program, and a storage medium in which the program is recorded and which is readable by the computer are included in the present invention.

Moreover, the present invention may be embodied as, for example, a system, a device, a method, a program, a recording medium or the like. Specifically, the present invention may be applied to a system constituted of a plurality of units or a device constituted of one unit.

It is to be noted that the present invention also includes a case where the program of software for realizing the above-described function of each embodiment (programs corresponding to the flowcharts of FIGS. 2 and 3 in the present embodiment) is supplied to the system or the device directly or via a remote area. In this case, the computer of the system or the device reads and executes a supplied program code.

Therefore, to realize functional processing of the present invention in the computer, the program code itself installed in the computer is realized by the present invention. That is, the present invention also includes the computer program itself for realizing the functional processing of the present invention.

In this case, a configuration such as a program to be executed by an object code or an interpreter, or script data to be supplied to OS may be used as long as the configuration has a program function.

Examples of the recording medium for supplying the program include a Floppy (registered trademark) disk, a hard disk, an optical disk, a magnetic optical disk, an MO, a CD-ROM, a CD-R, a CD-RW, a magnetic tape, a nonvolatile memory card, a ROM, and a DVD (DVD-ROM, DVD-R).

As another method of supplying the program, the program may be supplied by accessing an internet homepage by use of a browser of a client computer to download the computer program itself of the present invention or a compressed file including an automatic installing function from the homepage into a recording medium such as the hard disk.

Moreover, the supplying method can be realized by dividing the program code constituting the program of the present invention into a plurality of files to download the respective files from different homepages. That is, the present invention includes a WWW server for downloading, to a plurality of users, the program file for realizing the functional processing of the present invention in the present invention.

Furthermore, the supplying method can be realized by: encrypting the program of the present invention and storing the program in a storage medium such as the CD-ROM to distribute the program to the user; allowing the user who has cleared predetermined conditions to download key information for decrypting the program from the homepage via the internet; and executing the encrypted program by use of the key information to install the program in the computer.

Additionally, the above-described function of the embodiment is realized, when the computer executes the read program. Moreover, the function of the embodiment can be realized, when the OS operating in the computer performs a part or all of actual processing.

Furthermore, the function of the embodiment can be realized, when the program read from the recording medium is written in the memory disposed in a function extension board inserted into the computer or a function extension unit connected to the computer, and a CPU or the like disposed in the function extension board or the function extension unit performs a part or all of the actual processing based on an instruction of the program.

The above-described embodiments are merely exemplary of the present invention, and are not be construed to limit the scope of the present invention.

The scope of the present invention is defined by the scope of the appended claims, and is not limited to only the specific descriptions in this specification. Furthermore, all modifications and changes belonging to equivalents of the claims are considered to fall within the scope of the present invention.

This application claims priority from Japanese Patent Application No. 2004-381606 filed on Dec. 28, 2004, which is hereby incorporated by reference herein.

What is claimed is:

1. An image capture apparatus having a continuous photographing mode for continuously photographing still images, comprising:

an image capture unit that generates an image signal of an object;

a pseudo shutter curtain generating unit that generates a pseudo shutter curtain signal corresponding to a pseudo shutter curtain;

an image synthesizing unit that synthesizes the image signal generated by the image capture unit and the pseudo shutter curtain signal generated by the pseudo shutter curtain generating unit; and a display unit that displays the image signal and the pseudo shutter curtain signal, wherein the pseudo shutter curtain generating unit sets the pseudo shutter curtain to be translucent, if the image capture apparatus is in the continuous photographing mode.

2. The image capture apparatus according to claim 1, wherein the image capture apparatus has a single photographing mode for photographing one still image, and wherein the pseudo shutter curtain generating unit changes a color of the pseudo shutter curtain, if a photographing mode of the image capture apparatus is changed to the continuous photographing mode or the single photographing mode.

3. The image capture apparatus according to claim 1, wherein the pseudo shutter curtain generating unit changes a color of the pseudo shutter curtain in accordance with the number of images that can be photographed, if the image capture apparatus is in the continuous photographing mode.

4. The image capture apparatus according to claim 1, wherein the image capture apparatus is a digital camera.

5. A method of controlling an image capture apparatus having a continuous photographing mode for continuously photographing still images, the method comprising the steps of:

generating an image signal of an object;

generating a pseudo shutter curtain signal corresponding to a pseudo shutter curtain;

synthesizing the image signal and the pseudo shutter curtain signal;

displaying the image signal and the pseudo shutter curtain signal; and setting the pseudo shutter curtain to be translucent, if the image capture apparatus is in the continuous photographing mode.

6. The method according to claim 5, further comprising the step of:

changing a color of the pseudo shutter curtain, if a photographing mode of the image capture apparatus is changed to the continuous photographing mode or a single photographing mode, wherein the single photographing mode is a photographing mode for photographing one still image.

7. The method according to claim 5, further comprising the step of:

changing a color of the pseudo shutter curtain in accordance with the number of images that can be photographed, if the image capture apparatus is in the continuous photographing mode.

8. The method according to claim 5, wherein the image capture apparatus is a digital camera.

* * * * *